Nov. 7, 1933. E. M. BOUTON Re. 18,987

ELEVATOR CONTROL SYSTEM

Original Filed Jan. 16, 1928 2 Sheets-Sheet 1

INVENTOR
Edgar M. Bouton
BY
ATTORNEY

Nov. 7, 1933. E. M. BOUTON Re. 18,987

ELEVATOR CONTROL SYSTEM

Original Filed Jan. 16, 1928 2 Sheets-Sheet 2

INVENTOR

Edgar M. Bouton

BY

ATTORNEY

Reissued Nov. 7, 1933

Re. 18,987

UNITED STATES PATENT OFFICE 18,987

ELEVATOR CONTROL SYSTEM

Edgar M. Bouton, Park Ridge, Ill., assignor to Westinghouse Electric & Manufacturing Company, a corporation of Pennsylvania Original No. 1,720,538, dated July 9, 1929, Serial No. 247,156, January 16, 1928. Application for reissue April 11, 1931. Serial No. 529,535

10 Claims. (Cl. 187—29)

My invention relates to control systems and it has particular relation to systems of control for road vehicles, elevators, hoists and similar apparatus.

An object of my invention is to provide a control system for elevators wherein the elevator may be started by an attendant on the car and stopped by the persons desiring to use the car.

Another object of my invention is to provide a control system for elevators wherein the car is started by an attendant on the car and stopped by the operation of push-buttons, either at the landings at which persons desire to board the car, or by push-buttons within the car corresponding to the floors at which passengers wish to leave the car.

Another object of my invention is to provide a control system for a plurality of elevators in a bank, wherein each of the cars is started by an attendant on the car and wherein passenger-operated means at the several landings traversed by the elevators will cause the first car to approach the corresponding floor to stop for such passenger or passengers.

Another object of my invention is to provide a control system, as described in the preceding paragraph, wherein the car will stop only when travelling in the direction in which the passenger wishes to go.

Another object of my invention is to provide a control system for a plurality of elevators in a bank, wherein each car may be started by the attendant on the car and stopped in response to passenger-operated push-buttons and wherein the first car to approach the floor restores the passenger-operated buttons and prevents cars approaching the floor subsequently from stopping at such floor.

Another object of my invention is to provide a control system for a plurality of elevators operating between a plurality of floors, wherein the shaft for each of the cars is divided into a plurality of zones or blocks, each including several adjacent floors and wherein the condition of two cars being simultaneously within a zone or block prevents the car which first entered the zone from receiving signals or being stopped at any floor within that zone in response to calls from floors within that zone.

Another object of my invention is to provide a control system for elevators wherein cars are automatically stopped at the several floors in response to passenger-operated push-buttons, and wherein the approaching of two cars, travelling in the same direction within a predetermined distance, prevents the first car travelling in that direction from stopping in response to the passenger-operated push-buttons.

My invention will be described with reference to the accompanying drawings, wherein:

Figure 1 illustrates a control system for two elevators, A and B, the driving systems for which are identical and the control for only one of which will, therefore, be specifically described, the letter A preceding the reference characters for the parts described.

Figure 1:
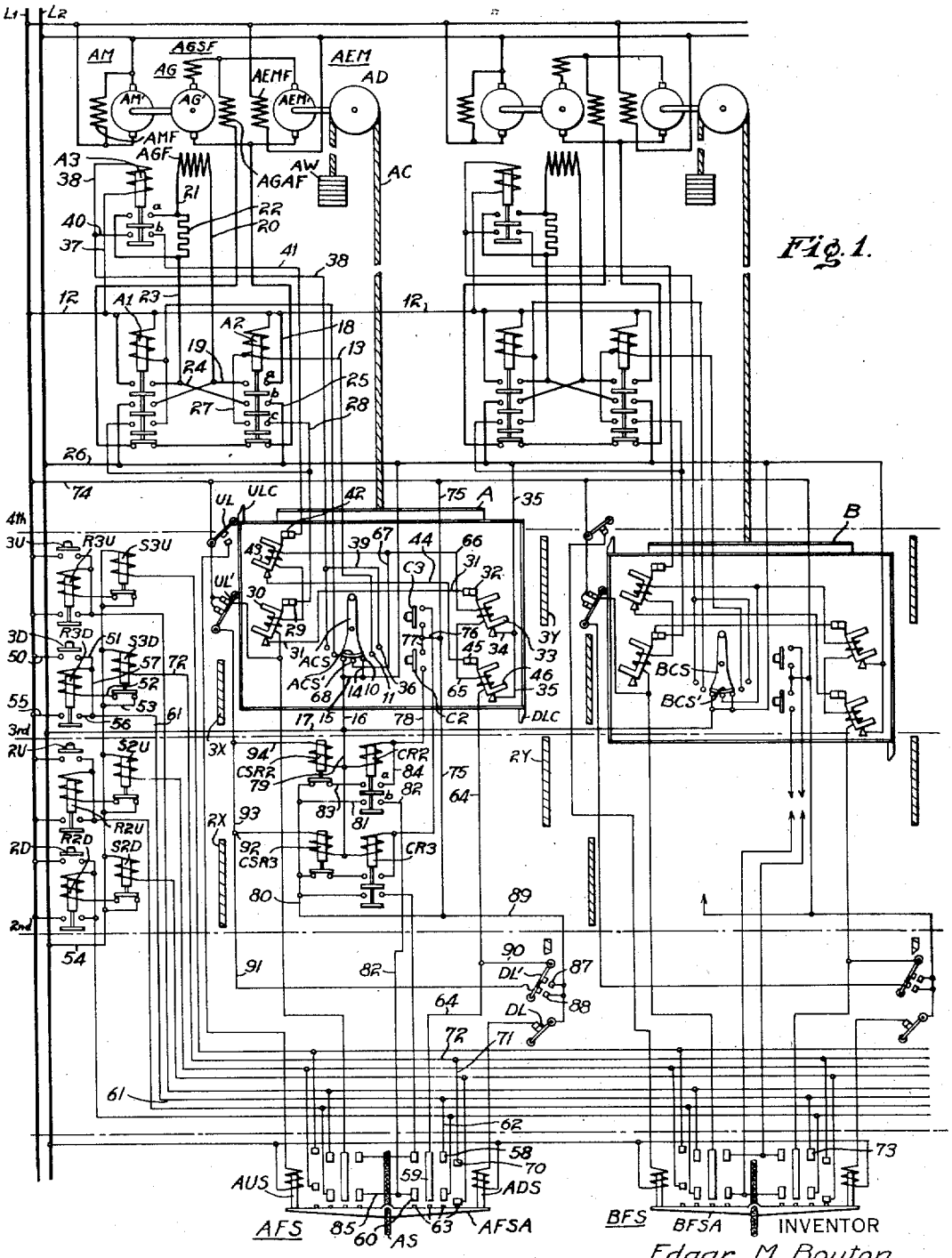
Figure 1 is a diagrammatic view of my control system as applied to two elevators operating in adjacent hatchways.

The control system for elevator car A comprises a control system of the variable voltage or Ward-Leonard type and includes a driving motor AM of the shunt-wound type having a shunt-field winding AMF and an armature AM'. Directly coupled to the armature AM' of the driving motor AM is an armature AG' of a generator AG. The generator AG is preferably of the compound-wound type including a series-field winding AGSF, a shunt-field winding AGF and a demagnetizing-field winding AGAF. The generator armature AG' is connected in "loop" circuit with the armature AEM' of a hoisting motor AEM. The hoisting motor AEM is provided with a shunt field winding AEMF and has its armature AEM' directly coupled to a hoisting drum AD, over which a cable AC, suspending the elevator car A, passes to a counterweight AW.

The hoisting motor is controlled as to direction and speed through the agency of an up-direction switch A1, a down-direction switch A2 and a speed relay A3. These relays are operated by the actuation of a car switch ACS mounted upon the elevator car A.

Each of the floors intermediate the terminal floors traversed by the elevator car A, is provided with a pair of call push-buttons, one for "up" and one for "down" travel. The call buttons for the third floor are designated by the reference numerals 3U and 3D, respectively, those for the second floor by the reference numerals 2U and 2D, respectively. While only four floors are illustrated in the drawing it will be obvious from the following description that the system may be applied to any number of floors without modification of the essentials of my invention.

No buttons are shown for the terminal floors since, in the usual method of operating elevators, each car makes a complete trip from one terminal to the other whenever the car is started in either direction, and since limit switches are universally provided for automatically stopping the car at the terminal floors.

Push-button relays are shown connected to the respective push-buttons 3U, 3D, etc., and are designated, respectively, by the reference numerals R3U, R3D, R2U and R2D. The coils of these relays are respectively connected in series relation with contact members on reset relays S3U, S3D, etc. These relays comprise means for registering and cancelling calls for service at the corresponding floors, as hereinafter more fully described.

A push-button for each of the floors is mounted on the car A, the button for the third floor being designated by the reference numeral C3 and that for the second floor by the numeral C2. These buttons are associated with relays CR3, CSR3, etc., in a manner similar to that described for the buttons and relays mounted at the various floors. It will be noted that only one button for each floor is provided in the car for stopping the car when travelling in either direction.

Floor selectors AFS and BFS for the respective cars are illustrated in the lowermost portion of Fig. 1. The floor selectors are duplicates of each other and each comprises a series of contact segments mounted upon a suitable base (not shown) and traversed by a movable floor selector arm AFSA (or BFSA for car B). The arm AFSA is driven in correspondence with the movements of the elevator car A in the manner usually practiced in the control of signal systems, that is, the arm AFSA is mounted upon a screw AS, which is connected for rotation with some movable part of the elevator hoisting mechanism. As illustrated, the movable arm AFSA is partially rotated about the screw AS by means of a pair of magnetic members ADS and AUS so as to engage, respectively, the right hand or "down" set of contact segments with the brushes 63 of the right-hand portion of the floor selector arm AFSA, or to engage the left hand or "up" set of contact segments and the brushes on the left-hand portion of the selector arm AFSA, depending upon which of the magnetic members is energized.

The system will be best understood when described in connection with an assumed operation. Assuming that the elevator car A is at the uppermost terminal or fourth floor, the operator starts the car downwardly by moving the handle of the car switch ACS to the left, engaging contact members 10 and 11 with the contact segment ACS'. This operation energizes the down-direction switch A2 through a circuit extending from line conductor L1 through conductor 12, the coil of down-direction switch A2, conductor 13, contact member 11, contact segment ACS', contact member 10, and conductors 14, 15, 16 and 17, to line conductor L2.

Down-direction switch A2 completes a circuit for the generator shunt field winding AGF extending from line conductor L1, through conductors 12 and 18, contact members *a* of switch A2, conductors 19 and 20, the generator shunt field winding AGF, conductor 21, resistor 22, conductors 23 and 24, contact members *b* of switch A2, and conductors 25 and 26 to line conductor L2. Direction switch A2 also completes a self-holding circuit extending from line conductor L1, through conductor 12, the coil of the down-direction switch A2, conductor 27, contact members *c* of switch A2, conductor 28, the normally closed contact members 29 of the up stop-inductor-relay 30, conductor 31, the normally closed contact members 32 of down stop-inductor-relay 33, and conductors 34, 35 and 26 to line conductor L2.

The functions of the inductor relays 30 and 33 in this system are the same as those disclosed in my copending application Serial No. 731,921, filed August 14, 1924, and assigned to the Westinghouse Electric & Manufacturing Company. In that application is disclosed an elevator control system wherein the holding circuits for the direction and speed switches are automatically opened by the inductor-relays as the car approaches predetermined points in the hatchway, thus stopping the car accurately level with the adjacent floor.

Referring again to Fig. 1, a further operation of the car switch ACS engages the contact members 10 and 36, completing a circuit for the speed relay A3 extending from line conductor L1, through conductors 12 and 37, the coil of relay A3, conductors 38 and 39, contact member 36, contact segment ACS' of car switch ACS, contact member 10, and conductors 14, 15, 16 and 17 to line conductor L2. The relay A3 closes its contact members *a*, excluding resistor 22 from the circuit for the generator shunt field winding AGF causing the elevator motor AEM to increase its speed and, by operation of its contact members *b*, completes a self-holding circuit extending from line conductor L1, through conductors 12 and 37, the coil of relay A3, conductors 38 and 40, contact members *b* of switch A3, conductor 41, normally closed contact members 42 of an up slow-down-inductor-relay 43, conductor 44, the normally closed contact members 45 of a down slow-down-inductor-relay 46, and conductors 35 and 26 to line conductor L2.

The inductor relays 30, 33, 43 and 46 are preferably of the type described in the copending application of John F. Clancy, Serial No. 559,997, filed May 11, 1922, and in the copending application of H. W. Williams, Serial No. 190,482, filed May 11, 1927, and assigned to the Westinghouse Electric & Manufacturing Company. The operation of these relays is such that the energization of the coil for the relay does not actuate the associated contact members immediately, but when the relay structure is brought adjacent a magnetizable inductor plate, the energized coil will effect an operation of the contact members.

When the car is moving upwardly, the up inductor-relays 30 and 43 cooperate with magnetizable iron inductor plates mounted in the hatchway, one for each of the floors, the plate for the third floor being designated by reference numeral 3X, and that for the second being designated by reference numeral 2X. The down inductor relays 33 and 46 cooperate with inductor plates 3Y and 2Y, as the car approaches the third and second floors, respectively, in the down direction. The relative position of the inductor plates and inductor-relays with reference to the floors is such that the relays will be actuated to open their contact members when the car is at such distance from the floors as to permit the opening of the speed and direction switches to stop the car accurately level with the adjacent floor.

As soon as the elevator car A starts downwardly, the attendant on the car may return the car switch ACS to the central or off position, and the car will continue to move downwardly at high speed, since the above-traced self-holding circuits for the direction and speed switches remain closed independently of the car switch ACS.

As the car approached the upper terminal on its way up, (prior to the start of the down trip as described) a cam ULC mounted on the car was brought into engagement with a switch UL, preferably of the limit switch type, and disengaged the contact members of the switch. This operation of the switch UL opened the circuit for the "up" floor selector magnet AUS, permitting the coil of the "down" floor selector magnet ADS to draw the right-hand portion of the floor selector arm AFSA into engagement with the down sets of contact segments (those on the right-hand portion of the floor selector AFS). The magnets AUS and ADS are of the high-resistance type and are designed to have their circuits completed at all times during which the car is between the terminals. When the movable arm AFSA has been rocked to "down" contact-engaging position, by the opening of the circuit for the "up" magnet AUS, the subsequent reenergization of the magnet AUS will be ineffective to draw the arm back to its neutral position or to rock it in the "up" direction, until the down magnet ADS has been deenergized. A suitable switch DL is provided for engagement by a cam DLC when the car approaches its lower limit of travel for the purpose of deenergizing the "down" magnet ADS as the car arrives at the lower terminal. Thus, as the car starts downwardly, in response to the above-described operation, the floor selector arm AFSA will have been rocked to engage the down contact segments, that is, the right-hand set of segments.

Assume that a passenger at the third floor desires to travel downwardly and operates the button 3D at the third floor. A circuit is thus completed for the push-button relay R3D extending from line conductor L1, through conductor 50, the push-button 3D, conductor 51, the coil of relay R3D, conductor 52, the normally closed contact members of the relay S3D, and conductors 53 and 54 to line conductor L2. The energization of relay R3D completes a self-holding circuit extending from line conductor L1, through conductor 55, the contact members of the relay R3D, conductors 56 and 57 and thence through the coil of the relay R3D to line conductor L2, as previously traced for this coil.

The closing of the contact members of the relay R3D connects the line conductor L1 to the third floor contact segment 58. As the car approaches the third floor, the floor selector arm AFSA connects contact segments 58, and 59, thus completing a circuit to the coils of the "down" slow-down and stop relays 33 and 46, which circuit extends from line conductor L1 through conductor 55, the contact members of relay R3D, conductors 56, 61 and 62, contact segment 58, the brushes 63 on the floor selector arm AFSA, contact segment 59, conductor 64, the coil of relay 46, conductor 65, the coil of the relay 33, conductors 66 and 67, contact member 68 of the car switch ACS', contact member 10 and conductors 14, 15, 16 and 17 to line conductor L2. It will be noted that the circuits for the inductor relays extend through the central contact member 68 of the car switch ACS, thus rendering it necessary that the car switch ACS be in its central or off position, in order that the inductor relays may be energized.

As the car approaches more closely to the third floor, the inductor relay 46, in passing the inductor plate 3Y, opens its contact members 45, thus breaking the circuit for the speed relay A3. The opening of the speed relay A3 re-inserts the resistor 22 in the generator shunt field winding circuit and the car slows down. As the car approaches nearer to the third floor, the relay 33 is similarly actuated to open its contact members 32, thus deenergizing the "down" direction switch A2 and stopping the car accurately level with the third floor. These inductor-relays thus form a call-receiving means on the cars for the reception and translation of calls for service for the cars.

After the car is stopped and the third floor passenger has entered, the attendant on the car may again start the car downwardly by the operation of the car switch ACS, as previously described. The car will continue downwardly, stopping in response to the operation of any of the "down" passenger-operated buttons as the car approaches the corresponding floor.

Just prior to the time that the car arrives at the third floor level, the floor selector arm AFSA will engage the contact member 70 on the floor selector, thus connecting, by means of the brushes 63, the contact segments 58 and 70. This operation will complete a circuit for the reset relay S3D to restore push-button relay R3D. This circuit extends from line conductor L1, through conductor 55, contact members of the relay R3D, conductors 56, 61 and 62, contact segment 58, brushes 63 of floor selector AFS, contact segment 70, conductors 71 and 72, coil of relay S3D, and conductor 54 to line conductor L2. The operation of relay S3D opens the holding circuit for the relay R3D, thus restoring the circuits for the third floor down call to normal inoperative condition.

It will be observed that the energization of the relay R3D in response to the operation of the button 3D connects line conductor L1 to contact segment 58 for the car A and also to the contact segment 73 of the floor selector for car B. The conductor 61 may be further extended to connect to any number of elevators in the bank, whereby the operation of a single button will condition the floor selectors for all of the cars to operate the inductor slow-down and stop relays for the associated car, as that car approaches the third floor. The first of the cars to approach the floor will be caused to stop and, as the car arrives at the floor, the consequent restoration of the relay R3D to normal position prevents any other car subsequently approaching the third floor from stopping in response to this third-floor "down" call.

Assume that the passenger who entered the car at the third floor desires to travel to the second floor. The attendant on the car will operate the button C2, completing a circuit for the relay CR2 extending from the line conductor L1, through conductors 74, 75, 76 and 77, push-button C2, conductor 78, the coil of relay CR2, and conductors 79 and 17 to line conductor L2. The operation of relay CR2 connects line conductor L1 to the contact segment 60 of the floor selector by way of conductors 74, 75, 80 and 81, contact members *b* of relay CR2, and conductor 82. The relay CR2 also completes a self-holding circuit which extends from line conductor L1, through conductors 74, 75 and 80, normally closed contact members of the restoring relay CSR2, conductor 83, the contact members *a* of relay CR2, conductor 84, the coil of relay CR2 and conductors 79 and 17 to line conductor L2.

As the car approaches the second floor, the engagement of the contact segment 60 and the contact segment 59 by the brushes 63 of the arm AFSA will complete a circuit for energizing the inductor slow-down stopping relays 46 and 33 in a manner similar to that described for the third floor stop. The car will thus be stopped at the second floor.

It will be observed that the conductor 85 connecting the second floor segments for the "up" and "down" directions, respectively, permits the operation of the second floor car button C2 to energize both the up and down segments for the second floor; thus the car will be caused to stop at the second floor from either direction in response to the operation of the car button C2, and similarly the button C3 will cause the car to stop at the third floor from either direction.

The car push-button relays for car B corresponding to relays CR2 and CSR2, etc., have been omitted in the drawing, in order to simplify it. It must be assumed, however, that these relays are provided for car B as indicated by the arrow-heads on the corresponding conductors.

As the car continues its downward travel and approaches the first floor, the cam DLC will engage a switch DL', preferably of the limit switch type, and will close the contact members 87 and 88 of the switch. The contact members 87 will complete a circuit energizing the "down" inductor relay coils 33 and 46, which circuit extends from line conductor L1, through conductors 74, 75 and 89, contact members 87 of the switch DL', conductors 90 and 64 to the coils of relays 46 and 33, and thence to line conductor L2, as previously traced for these coils.

The contact members 88 of switch DL' complete a circuit for the restoring relays CSR2 and CSR3 extending from line conductor L1 through conductors 74, 75 and 89, contact members 88, and conductor 91, to a junction-point 92 and thence to the coils of the relays CSR2 and CSR3 in parallel relation, the circuit for relay CSR2 extending by way of conductors 93 and 94, the coil of relay SCR2 and conductors 79 and 17 to line conductor L2. Thus, the push-button relays for all of the car push-buttons are restored when the car approaches the lower limit of travel. As the car approaches the upper limit of travel, the switch UL' operates in a similar manner to perform the restoring function at the end of the "up" trip.

From the above description, it will be clear that each of the elevators is started by the opera- of the car switch for that car, by the attendant on the car, and that as soon as the elevator starts, the car switch may be centered, permitting the car to continue moving until it automatically stops through the operation of the landing push-buttons 3U, etc., common to all cars, or the car buttons individual to the car. The operation of one of the landing buttons 3U, etc., prepares circuits for stopping all of the cars in the bank, but only the first car to approach the floor in the direction for which such button is operated will stop at the floor.

If, for any reason, such as when a car is loaded to capacity, the operator desires to travel to the terminal floor without making further stops, the movement of the car switch ACS will break the circuit to the inductor relays and the car will not stop in response to an operated push-button. This permits the operator to pass floors for which buttons have been operated.

Figure 2:
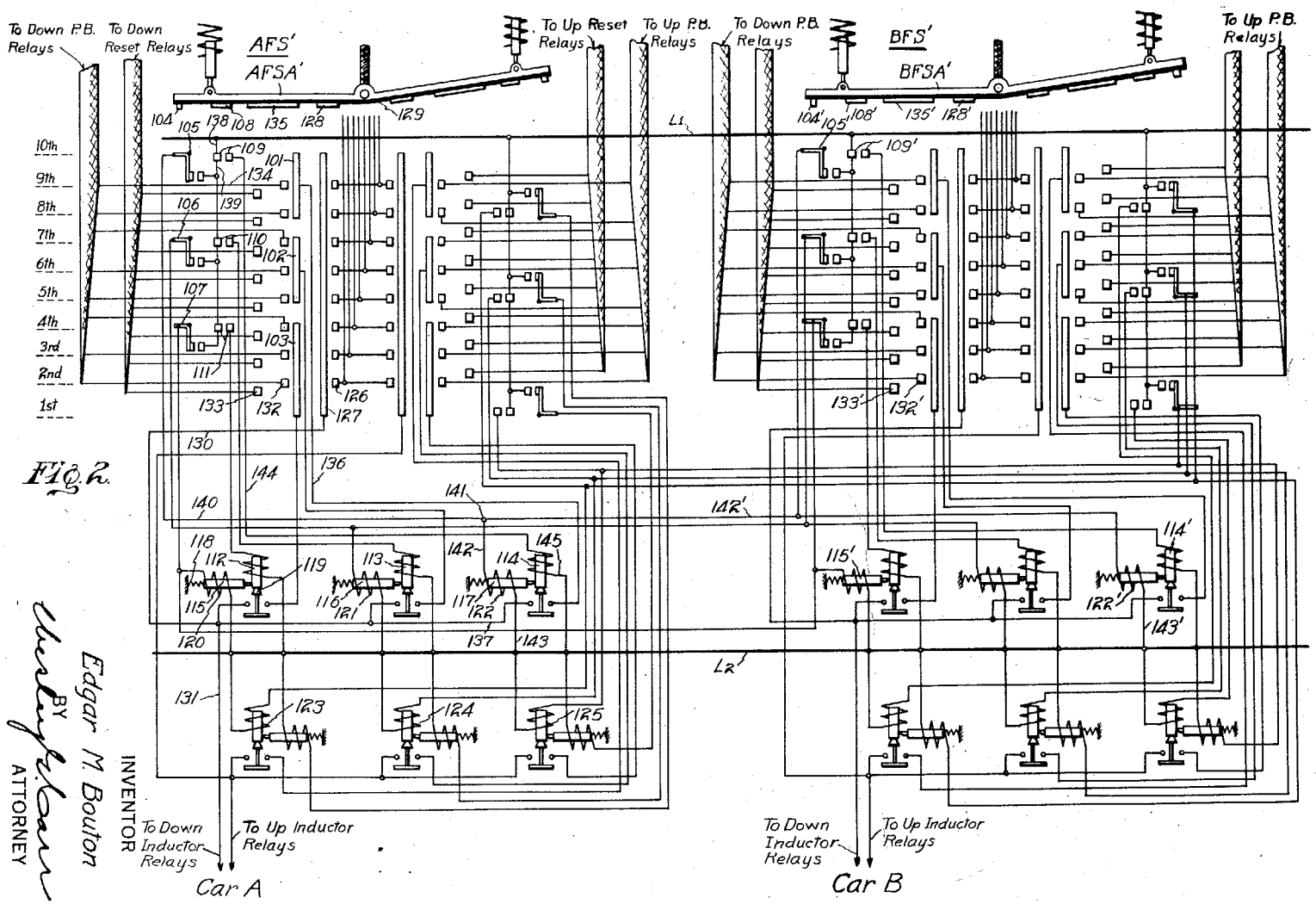
Fig. 2 is a diagrammatic view of my blocking or zoning system as applied to two adjacent elevators operating between ten floors.

Figure 2 shows the blocking or zoning system for two elevators operating between ten floors. This system comprises floor selectors AFS' and BFS' for the cars A and B respectively. The general arrangement of the contact segments for these floor selectors is identical with that shown for the floor selectors in Fig. 1. The essential differences between the floor selector of Fig. 2 and those of Fig. 1 reside in the division of the contact segment 59 shown in Fig. 1 into three separate segments designated as 101, 102 and 103 in Fig. 2. Each of these segments extends over such portion of the travel of the floor selector arm AFSA', as represents the travel of the elevator between at least three floors.

In the system illustrated, the ten-floor hatchway is divided into three zones, the first including the first, second, third and fourth floors, the second including the fifth, sixth and seventh floors, the last including the eighth, ninth and tenth floors. The description of the relation of the various floors will be hereinafter set forth with reference to the position of the car relative to the floors, as represented by the movement of the floor selector arm over the floor selector.

The floor selector AFS' shown in Fig. 2 represents a series of "down" segments, shown on the left-hand side of the floor selector, and a series of "up" segments on the right-hand side. At the entrance to each of the zones of blocks, as defined by segments 101, 102, 103, etc., a normally open contact switch mechanism, comprising switches 105, 106 and 107, is mounted for actuation by a tripping mechanism 104 on the floor selector arm AFSA', which will engage and operate for switches 105, 106 and 107, respectively, as the car moves downwardly into the zones defined respectively by the segments 101, 102 and 103.

A contact brush 108 on the floor selector arm engages and bridges a set of contact members 109, 110 and 111, as the car enters the zones 101, 102 and 103.

A set of "down" block relays, one for each of the zones, designated as 112, 113 and 114 are provided having their coils respectively connected to the contact segments 111, 110 and 109 and their contact members respectively connected to the segments 103, 102 and 101. The purpose of the block relays 112, etc., is to connect the block segments 101, etc., to the "down" inductor relay coils only when the car is in the corresponding block or zone.

Each of the relays 112, etc., is provided with a latching member, the reference characters 115, 116 and 117, respectively, designating the latches for the relays 112, 113 and 114. The latch member 115 is normally spring-pressed, as by spring 118, to engage the latch member 115 with a shoulder or notch 119 in the armature of the block relay 112. Similar springs operate the latches 116 and 117. Magnetizable coils 120, 121 and 122 are arranged to withdraw the latch members 115, etc., from engagement with the respective block relays.

A similar set of block relays, latches and coils are provided for the "up" direction of travel, being designated generally as 123, 124 and 125.

The contact segments 126 are connected as in Fig. 1 to the respective push-buttons mounted upon the car and are designed to be connected with the continuous contact strip 127 by means of a brush 128 insulatingly mounted, as at 129, on the floor selector arm. The contact strip 127 is connected, as by a conductor 130, to a conductor 131, which feeds the coils of the "down" inductor-relays (33 and 46 of Fig. 1). The contact segments 132 are connected in parallel relation to corresponding contact segments 132' on the floor selector BFS' for the car B and in series relation with the contact members of the push-button relays corresponding to R3U and R3D of Fig. 1. The contact segments 133 are respectively connected to the reset relays corresponding to S3U and S3D in Fig. 1, for the corresponding floor.

It will be observed that the contact segment 101 (which corresponds to the contact segment 59 in Fig. 1) may be connected to the inductor relays 33 and 46 only in the case that the block relay 114 has its contacts closed. The circuit for these inductor relays extends from the line conductor L1 to the contact segment 132 through the push-button relay R3D, etc., of Fig. 1, and conductor 134. Thence the circuit continues through the segment 132 corresponding to the ninth floor, brush 135 on the floor selector arm AFSA', segment 101, conductor 136, the contact members of relay 114, and conductor 137 to the conductor 131 which extends to the inductor relays 33 and 46 of Fig. 1.

Assuming the car to be at the upper terminal or tenth floor and to be started downwardly as described with reference to Fig. 1, the left-hand portion of the floor selector arm will engage the left-hand set of contact segments on the floor selector. As the car starts, the tripping member 104 will engage and operate the switch 105, thereby completing a circuit for the latch magnet 122 for the car A and magnet 122' for the car B. This circuit may be traced from line conductor L1, through conductors 138 and 139, the contact members of the switch 105, and conductor 140, to junction point 141, whence one branch extends by way of conductor 142 through the magnet coil 122, and conductor 143 to line conductor L2 and the other branch extends by way of conductor 142', the magnet 122' and conductor 143' to line conductor L2. The energization of the magnets 122 and 122' will release any of the first block relays for all of the cars, which may happen to be energized.

At substantially the same instant, the brush 108 of the floor selector arm will engage and bridge the contact segments 109, completing a circuit for the first block relay 114 for the car A, which circuit extends from line conductor L1 through conductor 138, contact segments 109 and brush 108, conductor 144, the coil of block relay 114, and conductor 145 to line conductor L2. This operation energizes the block relay 114 and causes the relay to close its contact members *a*. The car A will thereafter pick up any call for the upper zone, that is, the ninth and eighth floors and make the necessary automatic stops in response to the calls registered by the floor buttons (not shown) for the ninth and eighth floors.

As the car passes the eighth floor, the trip member 104 will engage and operate the switch 106, and the brush 108 will engage the contact segments 110 to first release all of the second block relays and subsequently actuate the second block relay 113 corresponding to the elevator car A. This operation prepares the car to take all calls for the middle zone, that is, the seventh, sixth and fifth floors.

Assume now that the elevator car B, operating under substantially light conditions of traffic, overtakes or approaches closely the car A, for example, when the car A is still within the upper zone or block. The tripping member 104' of the floor selector arm BSFA' will engage and operate the switch 105', energizing the magnets 122 and 122', permitting the block relay 114 to drop out, and thus preventing car A from receiving any further calls while within the upper block. At substantially the same instant the brush 108' engages the contact segments 109' and operates the block relay 114' for the car B, thus placing the car B in condition to receive the registered calls within the first block. The exclusion of the car A from receiving further calls while within that block permits the car A to move into the next block before receiving any further calls and throws the burden of the traffic to the car B.

For the usual operation, cars are dispatched at such intervals that, under normal traffic conditions, they will never overtake each other, and it is only under the condition of an abnormal traffic situation that such overtaking will occur.

My system, therefore, provides for caring for this abnormal traffic condition by releasing the first car, which has been bearing the burden of the traffic, from further load within a given zone and causing the traffic in that zone to be thrown upon the following car which has been operating under comparatively light traffic conditions.

It will be observed that my system provides for the distribution of the traffic in accordance with the load upon the several elevator cars and that this distribution will occur automatically in response to the variations of the traffic conditions.

The description and illustration of my system is merely illustrative, the system being capable of many variations in the apparatus and circuits described. I, therefore, do not desire to be limited to the system shown and described, except as defined in the appended claims.

I claim as my invention:

1. In a control system for elevators operable between a plurality of floors, an elevator car, means for starting said car, normally ineffective means for stopping said car level with said floors, including inductor relay means carried by said car and magnetizable plates for actuating said inductor relay means mounted adjacent said floors, manually operable call means for said floors and means operable in correspondence with movements of said car for rendering said stopping means effective to stop said car only when said car approaches a floor for which a call means is operated.

2. In a control system for elevators operable between a plurality of floors, an elevator car, means for starting said car, normally ineffective means for stopping said car level with said floors, including inductor relay means carried by said car, and magnetizable plates for actuating said inductor relay means mounted adjacent said floors, manually operable up-call means and down-call means for said floors, and means operable in correspondence with the movements of said car for rendering said stopping means effective to stop said car only when said car approaches a floor for which a call means is operated and in the direction corresponding to said operated call means.

3. In a control system for a bank of elevators operable over a path between a plurality of floors, a plurality of cars, means dividing said path into zones of operation, each zone including a plurality of adjacent floors, call means at said floors common to all of said cars, call-receiving means for each of said cars, means operable by the entry of a car into a zone for rendering the receiving means for all of said cars inoperative to receive calls from the floors in that zone, and means operable upon further movement of said car into said zone for rendering the receiving means for that car effective to receive calls for floors in that zone.

4. In a control system for a bank of elevators operable over a path between a plurality of floors, a plurality of cars, means dividing said path into zones of operation, each zone including a plurality of adjacent floors, call means for said floors common to all of said cars, a zone relay for each of said cars for each of said zones, means for each zone relay for maintaining said zone relay operative when actuated, means for releasing each of said maintaining means, means operable by the entry of a car into a zone for actuating the releasing means for that zone for all of said cars, and means operable by further movement of said car into said zone for actuating the zone relay for that zone for that car.

5. In a control system for a bank of elevators operable between a plurality of floors, a plurality of cars, means individual for each of said cars for stopping the associated car, call means at said floors, means dividing said floors into blocks, each block including a plurality of adjacent floors, and means operable by the entry of more than one of said cars into a block for rendering said call means for all but one of said cars ineffective to actuate the stopping means for said cars.

6. In a control system for a bank of elevators operable between a plurality of floors, a plurality of cars, means individual to each of said cars for stopping the associated car, call means at said floors, means dividing said floors into blocks, each block including a plurality of adjacent floors, and means to render said call means effective to actuate the stopping means for only the last of the cars to enter said block.

7. In a control system for a bank of elevators operable between a plurality of floors, a plurality of cars, means individual to each of said cars for stopping the associated car, call means at said floors, means dividing said floors into blocks, each block including a plurality of adjacent floors, and means for rendering the call means for any of the floors in said block ineffective to actuate the stopping means for the first car entering said block.

8. A control system for an elevator car comprising a floor-relay switch for each of a plurality of landings each having an operating winding and a self-holding circuit for the latter, each winding energizable from its associated landing, stop circuits responsive to said floor-relay switches, additional stop circuits controllable only from the car, and two sets of contact mechanisms to control said first and second named stop circuits, each set comprising a stationary contactor for each of said landings, and a contactor common to said stationary contactors, movable in accordance with the position of the car successively to engage said fixed contactors.

9. In combination, an elevator, a hoisting motor therefor having multi-speed regulation, a floor-relay switch for each of a plurality of landings, each having an operating winding, each winding energizable from its landing and having a self-holding circuit, a slow-down switch having an operating winding, circuits for said operating winding, one for each landing, each partially closed by its associated floor-relay switch when the latter is in actuated position, and contact mechanism effective to complete each circuit, said mechanism comprising a stationary contactor for each landing and an additional contactor common to all of said stationary contactors and movable in accordance with movement of the car successively to engage said stationary contactors.

10. In combination, an elevator car, a hoisting motor therefor having multi-speed regulation, a floor-relay switch for each of a plurality of landings, each having an operating winding energizable from its landings, and each having a self-holding circuit, a speed change switch having electro-magnetic actuating means, control circuits for said electro-magnetic means, one for each landing controlled by its associated floor-relay switch, each circuit partially closed by its associated floor-relay switch when in actuated position, and contact mechanism effective to complete each of said circuits, comprising a stationary contactor for each landing and an additional contactor common to all of said stationary contactors, and movable in accordance with movement of the car successively to engage said stationary contactors.

EDGAR M. BOUTON.